(12) United States Patent
Green et al.

(10) Patent No.: US 6,532,155 B2
(45) Date of Patent: Mar. 11, 2003

(54) TRANSCEIVER HOUSING AND EJECTION MECHANISM THEREFORE

(75) Inventors: Eric T. Green, Corning, NY (US); John R. Rowlette, Sr., Hummelstown, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 09/796,758

(22) Filed: Mar. 1, 2001

(65) Prior Publication Data

US 2001/0030855 A1 Oct. 18, 2001

Related U.S. Application Data

(63) Continuation of application No. PCT/US99/20282, filed on Sep. 2, 1999.
(60) Provisional application No. 60/098,828, filed on Sep. 2, 1998.

(51) Int. Cl.[7] .......................... H05K 7/10; H01R 13/64
(52) U.S. Cl. ..................... 361/733; 361/730; 361/732; 361/803; 439/374
(58) Field of Search ................. 361/728–736, 361/737, 784, 786, 803; 439/379, 630, 928.1

(56) References Cited

U.S. PATENT DOCUMENTS

| | | | | |
|---|---|---|---|---|
| 3,432,795 A | * | 3/1969 | Jayne ........................ | 439/60 |
| 4,579,406 A | * | 4/1986 | Laursen et al. .............. | 361/777 |
| 4,849,944 A | * | 7/1989 | Matsushita ................... | 714/718 |
| 5,088,931 A | * | 2/1992 | Niciolo et al. .............. | 439/188 |
| 5,528,408 A | * | 6/1996 | McGinley et al. ........... | 359/152 |
| 5,546,281 A | * | 8/1996 | Poplawski et al. .......... | 361/752 |
| 6,056,573 A | * | 5/2000 | Nishioka .................... | 235/441 |

* cited by examiner

Primary Examiner—Jayprakash N. Gandhi
(74) Attorney, Agent, or Firm—Synnestvedt & Lechner LLP (57) ABSTRACT

An ejection system for engaging a transceiver to a host circuit board in a guide rail having a front and back orientation and for ejecting said transceiver from said guide rail, said system comprising: (a) a latching mechanism within said guide rail adapted for latching to a projection extending from a housing of a transceiver when said transceiver is moved backward on said guide rail to an engaging position, thereby preventing said transceiver from moving forward; (b) resilient means within said guide rail adapted for urging said transceiver forward when said transceiver is in said engaging position; and (c) a release mechanism within said card guide and adapted for disengaging said latching mechanism from said projection when said release mechanism is actuated to a releasing position, thereby allowing said resilient means to move said transceiver forward.

13 Claims, 12 Drawing Sheets fig. 2 fig. 6 fig. 7

TRANSCEIVER HOUSING AND EJECTION MECHANISM THEREFORE

This application claims benefit of Provisional application Ser. No. 60/098,828, filed Sep. 2, 1998, and is a continuation of PCT/US99/20282, filed Sep. 2, 1999.

FIELD OF THE INVENTION

This invention is related generally to transceivers and, more particularly, to an interconnection system for use therewith.

BACKGROUND OF THE INVENTION

Optical transceivers are utilized typically in communications systems for converting signals between electrical and optical transmission media. These transceivers are typically mounted on circuit boards for use in such communication systems. The transceivers provide interconnections to optical media such as optical fibers or other optical wave guides and also provide interconnections to electrical transmission media such as traces on a printer circuit board or signal conductors in a cable. The optical interface or interconnection is typically achieved by a removable optical connector while the electrical interface has typically been achieved by soldering or otherwise permanently fixing the transceiver to the traces on the circuit board. Such an arrangement is shown in U.S. Pat. No. 5,528,408 which teaches an optoelectronic transceiver having a small foot print including a laser diode package contained within a subassembly mounted within the housing of the transceiver. The housing includes latches for retaining the subassemblies wherein. The subassemblies include first apertures for receiving mounting pins to lock the subassemblies within the housing. Plug latch members are mounted on the assemblies. Optical transmitters and receiver circuit and one row of nine contacts are mounted to a printed circuit board with two hole type solder connections.

Unfortunately, these known arrangements do not allow for easily replacing a failed transceiver component within the system. This problem is addressed in U.S. Pat. No. 5,546,281 which discloses an optoelectronic transceiver module having a ribbon style connector attached to a circuit board and protruding from the main housing. The ribbon style connector may protrude from either the bottom or one end of the main housing. In addition the ribbon style connector may comprise either a male ribbon style connector or a resilient male ribbon style connector which is mateable with a complimentary connector mounted on the printed circuit board. A problem exists with this arrangement in that while the transceiver provides a removal electrical connection to the printed circuit board, the electrical connection arrangement does provide accurate alignment, sequential mating, or rigid mechanical securing of the transceiver.

Furthermore, in optoelectronic transceivers, electromagnetic interference (EMI) shielding is important, especially when multiple transceiver units are in a stacked arrangement. EMI shielding typically requires minimizing any openings to eliminate the potential for a resonant cavity to be established. This can be a difficult task, however, when the transceiver modules are closely packed. Additionally, in high frequency applications, it is important to establish and maintain a good ground contact to provide EMI shielding. Providing a solid ground path to the transceiver also is important to maintain the quality of the signals transmitted thereon.

In addition to providing an electrical path to ground, it is important to provide a thermal path to a suitable heat sink as well. Indeed, the ability to dissipate heat in an efficient manner is an essential requirement for optoelectronic transceivers in high data rate communication lengths.

The present invention fulfills these needs among others.

SUMMARY OF THE INVENTION

The present invention provides for a transceiver housing and electrical interconnection for high data-rate transceivers. One aspect of the invention is a novel ejection mechanism which cooperates with a transceiver's housing not only to ejection the transceiver, but also to provide a good electrical and thermal path between the transceiver and the host circuit board.

Another aspect of the present invention is a housing and grounding configuration that improves EMI shielding. The improved EMI shielding, in turn, facilitates mounting transceivers adjacent one another in a row, in a stack, or even on opposite sides of the same host circuit board or other suitable electrical interface.

Another aspect of the present invention is drawn to a non-conductive sections of contacts which provides for sequential connection/disconnection between the contacts of the transceiver and those of the host circuit board. This configuration facilitates a reliable, durable interconnection scheme which is sequential and hot-pluggable.

BRIEF DESCRIPTION OF THE DRAWINGS

FIG. 3 is a top view of the transceiver structure of the invention of the present disclosure showing the various elements of the injection mechanism in hideaway view.

DETAILED DESCRIPTION OF THE INVENTION

Figure 1:
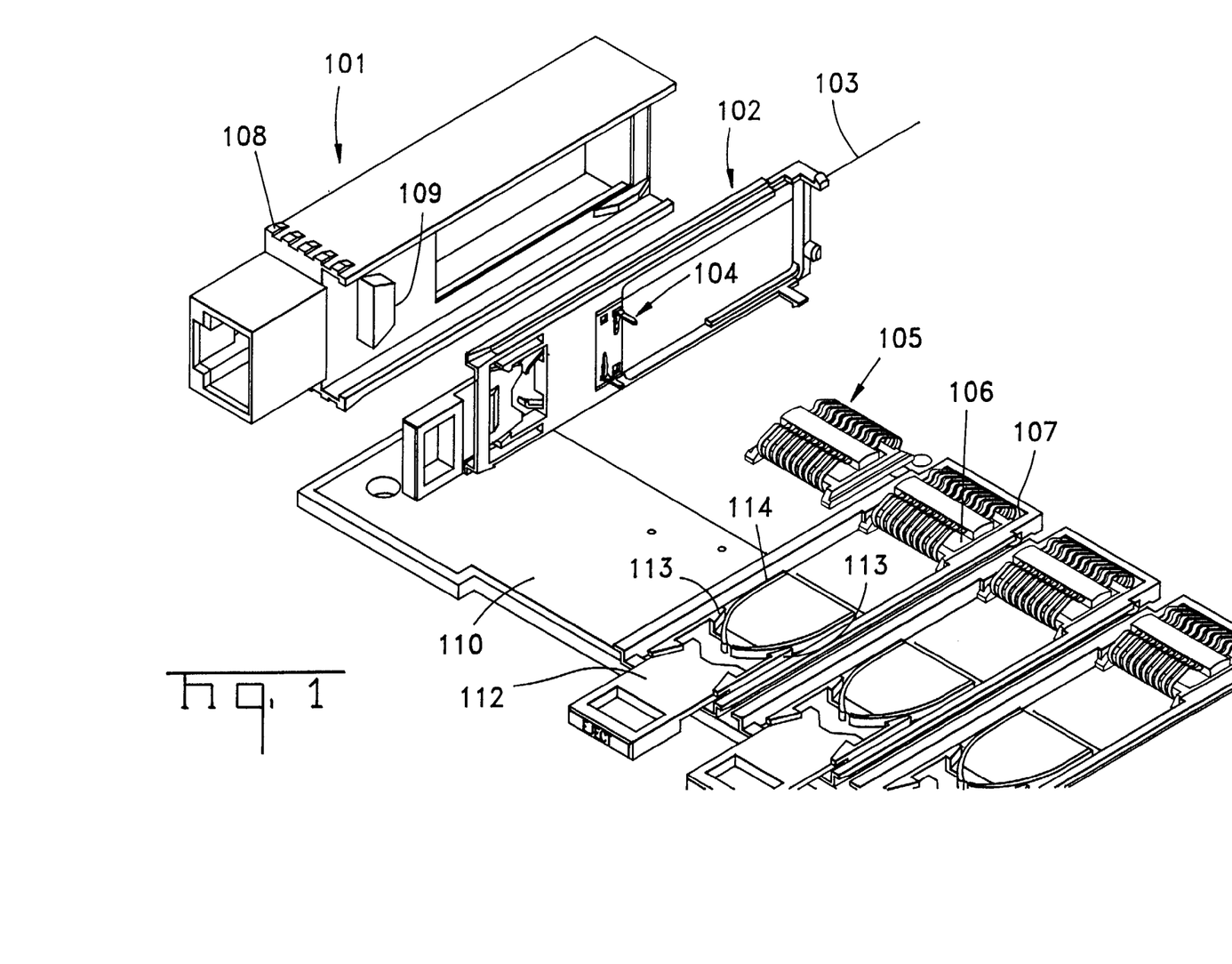
FIG. 1 is a exploded view of the housing for the transceiver with the ejector mechanism and contacts for the Z-axis transceiver hot-pluggable structure of the invention of the present disclosure.

Referring to FIG. 1, an exploded view of a transceiver of the present invention is shown. The transceiver shown is respectively a small form factor (SFF) transceiver (also referred to as MT-RJ transceiver) or a GBIC transceiver which are well known in the art. While the structure shown in FIG. 1 is exemplary and shows the versatility of various transceivers, clearly other transceiver packages can be used.

Referring back to FIG. 1, a transceiver housing 101 is shown which preferably is made from die cast zinc, although other materials can be used, preferably those being electrically and/or thermally conductive. The lower portion of the housing structure shown at 102 is interconnected to the electrical interface board, preferably a printed circuit board 103. The board lock contacts 104 are preferably standard board locks, for example, AMP action-pin contacts.

An ejection mechanism 112 is shown having locking members 113 and an ejector actuator 114 which operate in cooperation with the member 109. In a preferred embodiment, member 109 also provides an electrical ground between the chassis ground shown at 110 and the housing member 101 and the electrical circuitry in the housing (not shown). Preferably, Member 109 also provides a good thermal path to dissipate joule heat in operation.

Figure 2:
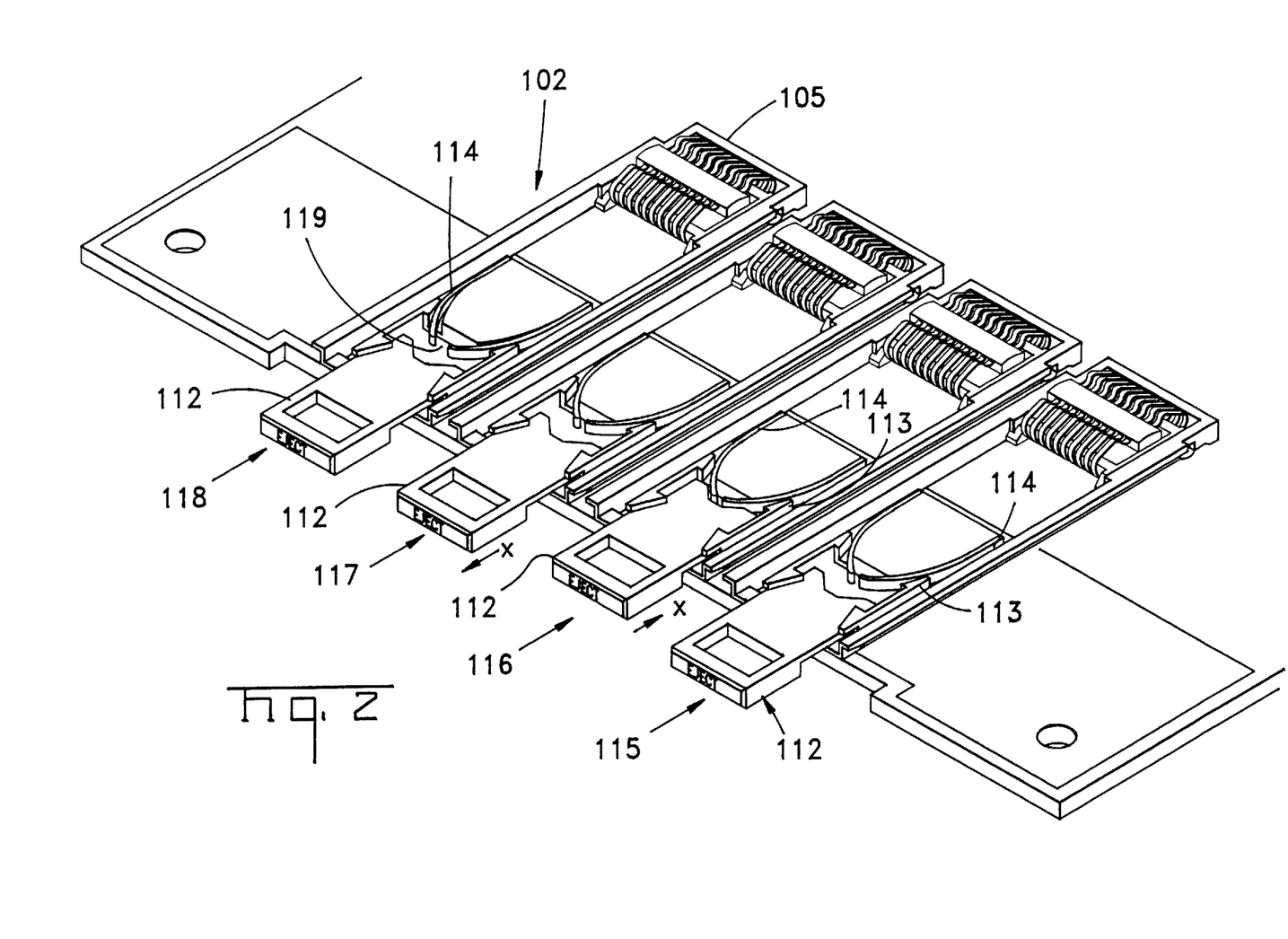
FIG. 2 is a perspective view of the lower portion of the transceiver interface showing various stages of the injection sequence.

Referring to FIG. 2, the interface member 102 along with the electrical interface 105 are shown without a transceiver. The function of the ejection mechanism 112 in cooperation with members 113 and 114 is shown in various stages of operations, 115, 116, 117, and 118. The interface connection shown at stage 115 is in a locked state, with the members 113 cooperating with the ejection mechanism to be locked. As shown at stage 116, when the ejection mechanism is moved in the X-direction (shown by the arrow), the members 113 are bowed outwardly as is shown in shadow in FIG. 2. This mechanism enables contact with the resilient spring members which are loaded by member 109 (not shown). By virtue of the resilience of member 114, which preferably comprises a metal material for durability and electrical/thermal conduction properties, the ejection mechanism is forced outwardly as is shown at 117. This urges the transceiver housing to move in the −X-direction. Finally, as shown at stage 118 the ejection mechanism is fully deployed with the members 114 opened and thereby fully extended as is shown by the space 119.

Referring to FIG. 3, a top view with hidden lines is showing the transceiver and ejection mechanism mounted on the electrical interface 103 is shown. The ejection mechanism again is shown in various stages of ejection, 115, 116, 117, and 118. As can be seen, the members 113 and 114 are actuated by the member 112 with motion in the X direction and the members 114 are loaded by the member 109 at stage 115. At stage 116, the motion of the ejection mechanism 112 in the positive +X-direction with the members 113 being bow-out. Stage 117 shows the ejection partially complete and, finally, at stage 118, the ejection of the transceiver is complete and the transceiver can be removed. In reverse sequence namely 118, 117, 116, 115, the transceiver would be "plugged in" in either a hot-pluggable or other interface.

Figure 10:
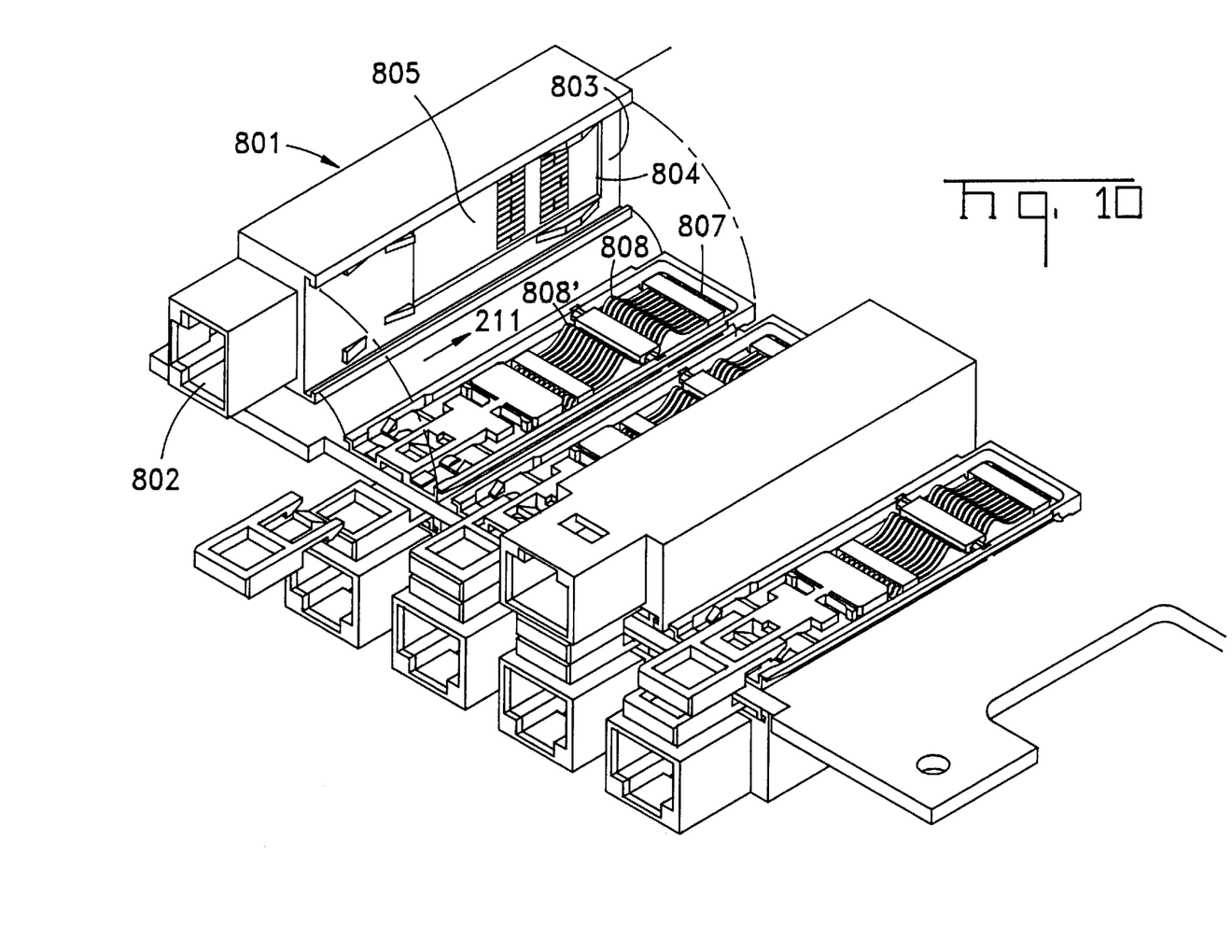
FIG. 10 is a perspective view of the mating circuit board with the cantilever contacts as well as the transceivers of the invention of the present disclosure, with one transceiver turned oriented to reveal the sequential contacts of the exposed printed circuit board.

The hot-pluggability aspects of the present invention will now be discussed. FIG. 10 shows a perspective view of another embodiment of the transceiver of the present invention. The transceiver housing in module 801 has an optical interface 802 and a lower surface 803 with a window 804. The circuit board 805 for the transceiver is shown with the contacts 806. The invention of the present disclosure is drawn to a technique for providing electrical interconnection of the contacts 806 to the contacts 807.

Figure 11:
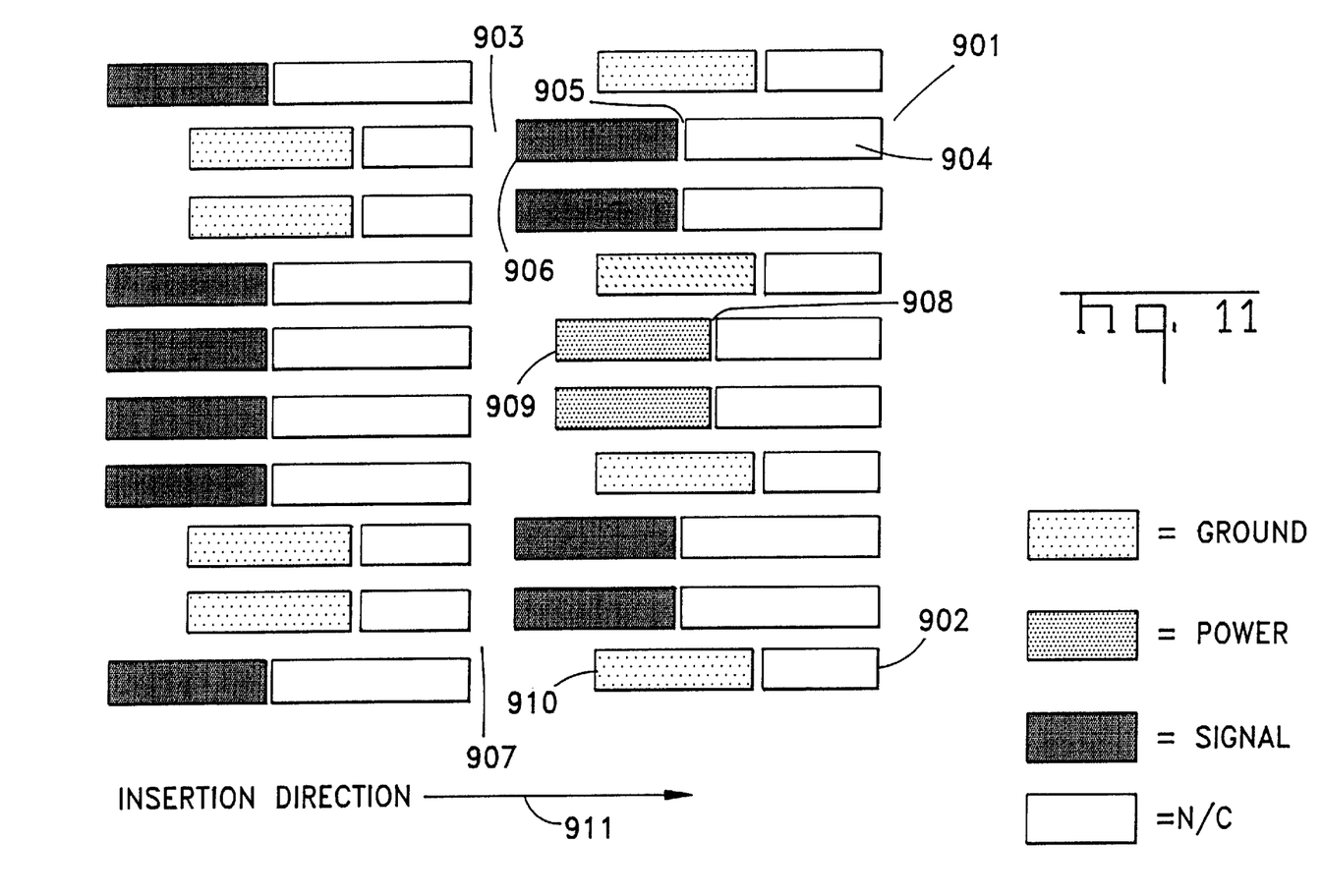
FIG. 11 is top view of the electrical contacts for the transceiver module of the invention of the present disclosure.

The contacts 806 are the subject of FIG. 11 and as are described herein. The contact sites 901 or contact pads shown in FIG. 11 preferably have gold surfaces and conventionally are used in a variety of electrical interconnections, such as those use in land-grid array packages. It should be understood, however, that these contact sites 901 are not limited to being pads, but alternatively could also be balls or other suitable electrical contact in an array type order. Such alternative contacts are those within the purview of one of ordinary skill of the art in the electrical interconnection technology.

The contact sites 901 are arranged in an array such that each site 901 in the array has a leading edge 902 disposed along a line extending across the entire cavity. The first set of contact sites 903 consist of two section, with a first section 904 extending from the leading edge 904 to a breakpoint 905 which is longer than a second section 906 extending from the break point 908 and is generally smaller than the second section 909 which extends from the break point 908 to the trailing section 910. Each of the break points 905, 908 represent a section of electrically-insulating material, for example dielectric, so as to isolate the first and second contact site sections from one another.

The transceiver contact array shown in FIG. 11 and at 806 in FIG. 10 has ground connections, plated connections which make no electrical contact, power connections and, of course signal connections. The arrangement and ordering of the ground, no contact, power and signal contacts can be tailored for the intended electrical interconnection of the transceiver to the interconnecting printed circuit board 807 in FIG. 10. The mating direction 910 in FIG. 1 is shown as direction 811 in FIG. 2 for the interconnection of the contacts on the printed circuit board of the transceiver to the contacts 808, 808' of the mating printed circuit board 807. The region 907 is a region between the contacts and rests above the depression surface 1003, shown in FIG. 12.

Figure 12:
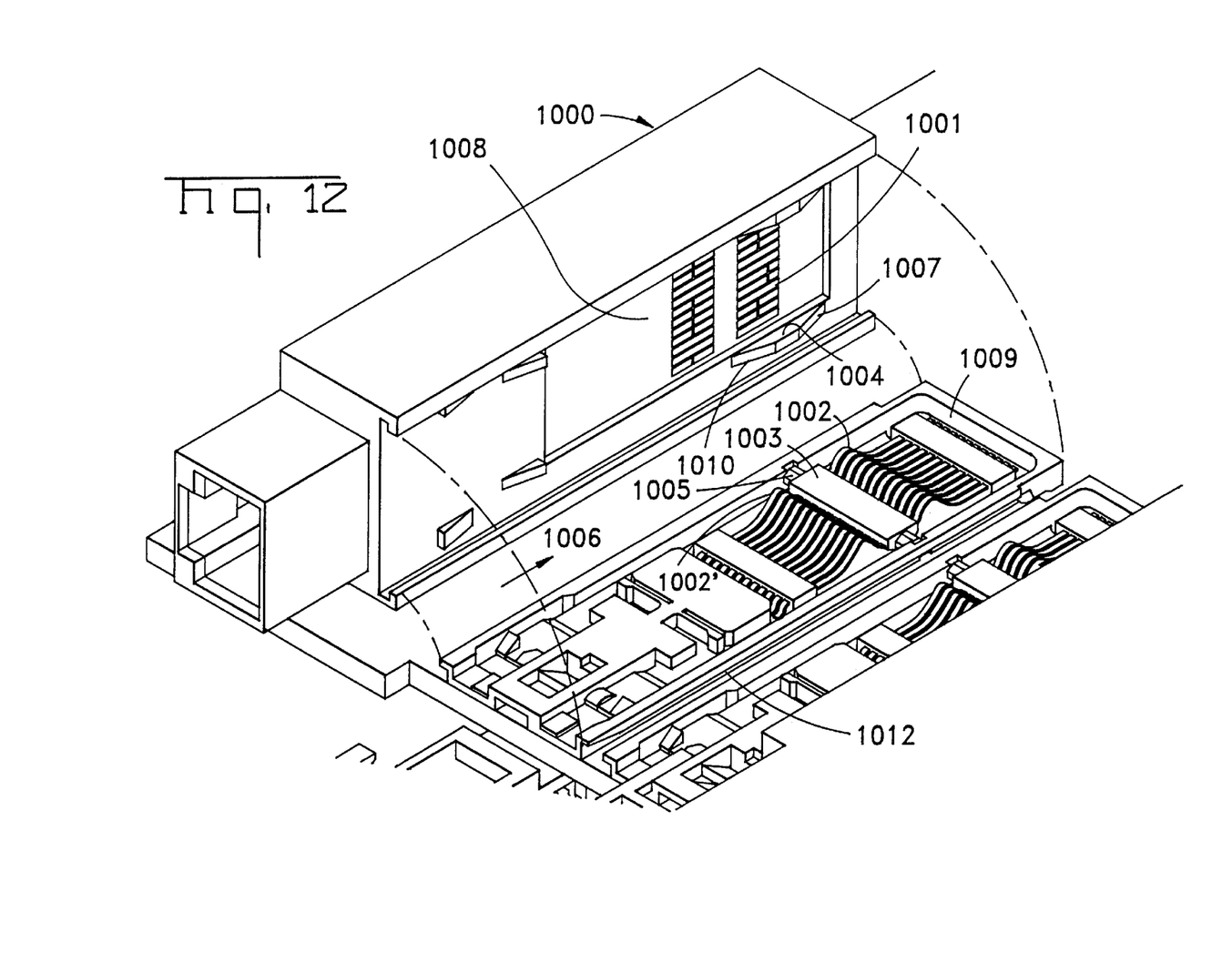
FIG. 12 is magnified view of the transceiver oriented to expose the contacts as well as the printed circuit board with the cantilever contacts in cam-follower shown.

A more detailed view of the interconnection scheme can be seen in FIG. 12. The contacts 1001 of the mating printed circuit board which connects the transceiver 1000 to electronics (not shown) is effected by the interconnection of the contacts 1001 to the cantilever contacts 1002 of the mating printed circuit board. The surface 1003, is referred to as a depression surface and together with the action of the cam surface 1004 with the cam follower surface 1005 effects the depression and thereafter the return to the first position of the cantilever contacts 1002. Upon insertion, as the transceiver moves in the mating direction 1006, the first surface 1007 of the cam 1004 makes contact with the cam follower surface 1005. This forces the rigid surface 1003 to force the contacts in a downward motion, shown at the normalized−Z direction in FIG. 12. This action removes the contacts 1002 and 1002' into a position where they are unable to make contact with the printed circuit board of the transceiver 1008. As stated previously, it is important that electrical connection be made in the desired sequential manner, and that the contacts 1002, 1002' do not make contact with the dielectric material of the printed circuit board 1008, to assure reliability and durability in long term use. The contacts 1002, 1002' are arranged in rows of signal, power and ground connection defined by the mating circuit board. The contacts each have a convex surface, with respect to the circuit board surface, for the purpose of mating to the plated pads in the parallel transceiver circuit board, shown at 1001 in FIG. 12.

The contact pads exposed on the bottom of the transceiver housing are of varying length, depending upon their function as is discussed in connection with FIG. 10. Ground contact pads are the longest, followed by power and finally the signal contacts. The differences in the length of the contact pads is designed to allow sequential mating of the cantilever contacts to the contact pads in a predetermined fashion. Additionally, pads are defined on the transceiver circuit board surface which are not electrically connected, but which are gold slated like the electrically functional pads. These pads are disposed on the surface of the transceiver contact to assure that the surface mount contacts do not come in contact with the abrasive surface of the circuit board during insertion and extraction of the transceiver module, thereby providing additional feature to improve durability and reliability. These pads are separated from the electrical functional pads by a small gap, the width of which is designed based upon the thickness of the pad and the radius of the cantilever mating contact 1002, 1002'. The gap is necessarily small to prevent the plated contact surface from abrading the circuit board as the contact slides from the unconnected pad to the electrically active pad. Optionally, the electrically functional pad may be divided into two parts, separate by an equally small gap as is defined between the unconnected pad and the active pad. The two pad parts are electrically connected internally within the circuit board. This permits a sequential mating as the transceiver 1000 moves in direction 1006 while still allowing a minimal contact pad length which is of course required in high-speed/high frequency electrical signal transmission.

The transceiver 1000 is mated to the mating circuit board 1009 by sliding along parallel tracks defined in a mounting rail attached to the circuit board. One of the parallel tracks is as shown at 1012 in FIG. 12. The transceiver slides along the rail 1012 and the cam surfaces 1004 and 1007 are engaged to the cam follower 1005 to deflect the contacts in the downward (−Z directional) below the surface of the transceiver circuit board during installation. The contacts are held in this deflective position as the module is inserted, until the contact pads of the transceiver circuit board are directly above the deflective cantilever surface mount contacts 1002, 1002'. The bottom surface of the cam follower includes slots which correspond to the contact array and assist in maintaining contact alignment relative to the mounting rail, and ultimately, the contact surfaces of the transceiver. Then, the cam position is reversed with the cam surface 1010 now being the cam surface, allowing the contacts 1002, 1002' to move in the normalized+Z direction toward the transceiver circuit board surface. As the transceiver is inserted farther, the surface mount contacts make contact with the plated pads on transceiver circuit board in a sequential manner, determined by the length of the pad as is described above. The contacts 1002, 1002' apply pressure to the circuit board determined by the design of the cantilever beam and the material selection. This pressure is maintained as the transceiver reaches its final mated position and is latched into place.

The leading edge of the transceiver housing includes a lead-in surface with an appropriate radius to prevent damage to the contact as the transceiver is mated. A similar lead-in is provided for the same purpose as the transceiver is unmated.

It is worthwhile to note that although the electrical interface shown at 105 in FIG. 1 is substantially identical to that depicted in FIG. 10, the shorter contacts of the interface of FIG. 1 tend to reduce parasitic conductances which is an important consideration at high frequency. Furthermore, the anti-overstress board 106 as well as the dielectric hold down member 107 in FIG. 1 are further advantages of the electrical contact interface of FIG. 10. That is, the hold down member 107 as well as the anti overstress board 106 improves reliability, particularly over time as the solder joint is protected from repeated stress through connection/disconnection of the transceiver. Finally, in the electrical interconnect structure shown in FIG. 1, there is reduction if not elimination of plastic between the leads, when compared to the lead interface in the invention of the above-captioned provisional application, which reduces parasitic capacitances as well.

Figure 4:
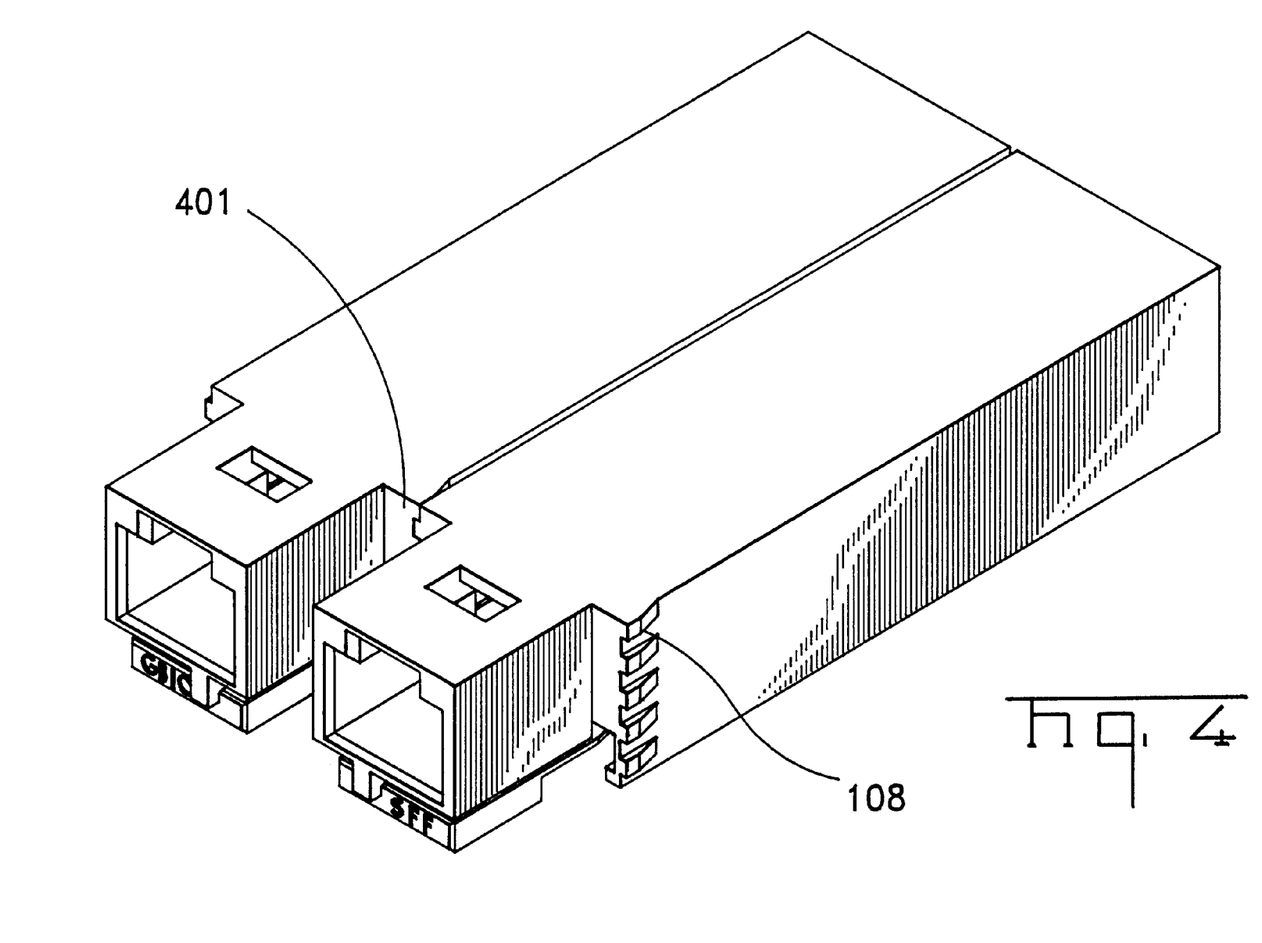
FIG. 4 is a perspective view of two transceiver elements, one being the GBIC and the other being the small form factor receivers in adjacent manner.

Referring to FIG. 4, another feature of the invention of the present invention is shown. Members 108 are EMI shielding members which interface with members in an adjacent transceiver housing 401. The members 108 are interdigitated with complimentary members on an adjacent transceiver module. By virtue of this structure and the interdigitation of the members 108 as shown at 401, 601, the tendency for electromagnetic interference is significantly reduced. In particular, the opening or gap between housing is significantly reduced such that resonant cavities (half wave lengths or multiples thereof) are not established at frequencies of operation.

Figure 7:
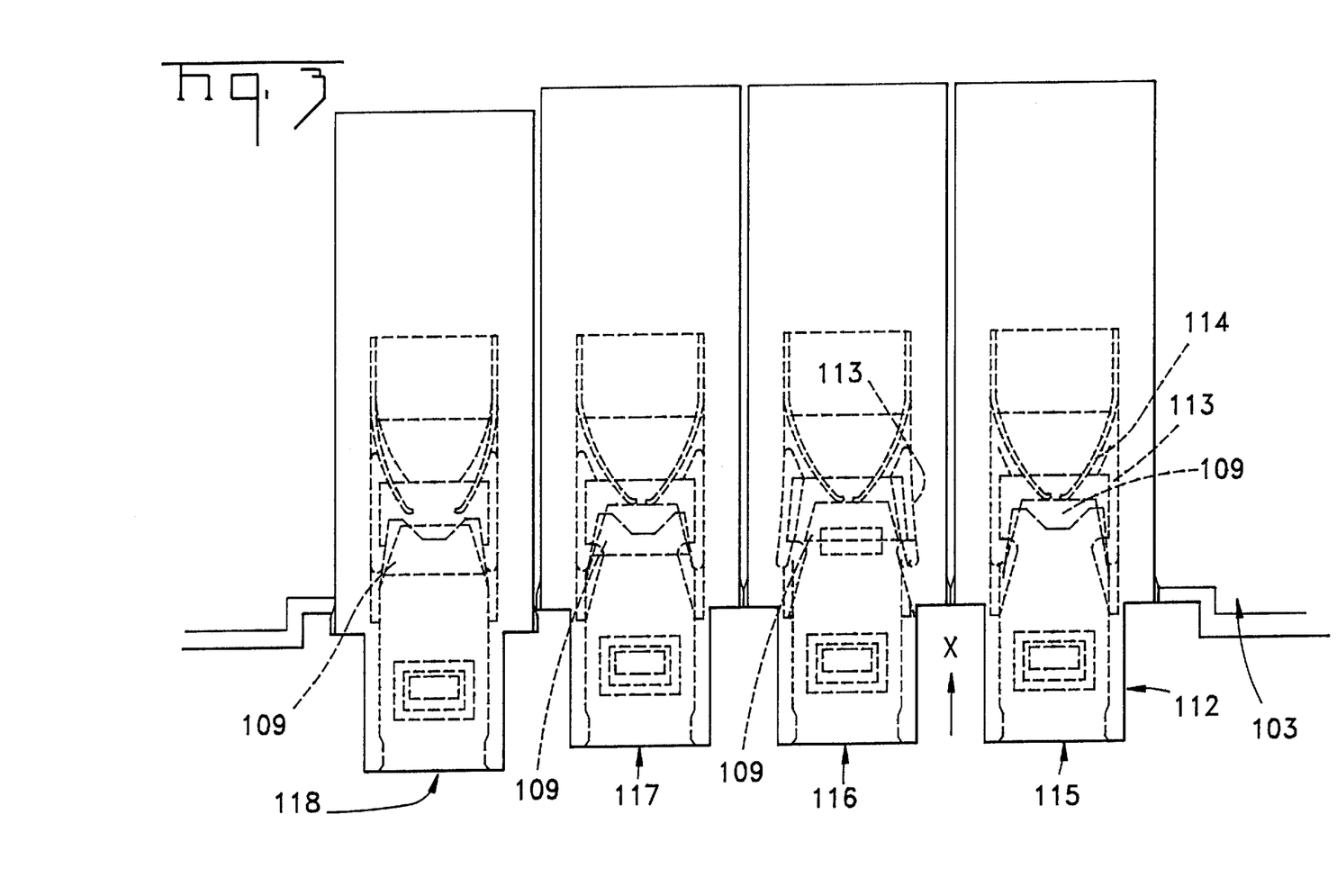
FIG. 7 is an exploded view of the transceiver housing showing an alternative embodiment of the EMI shielding feature.
Figure 8:
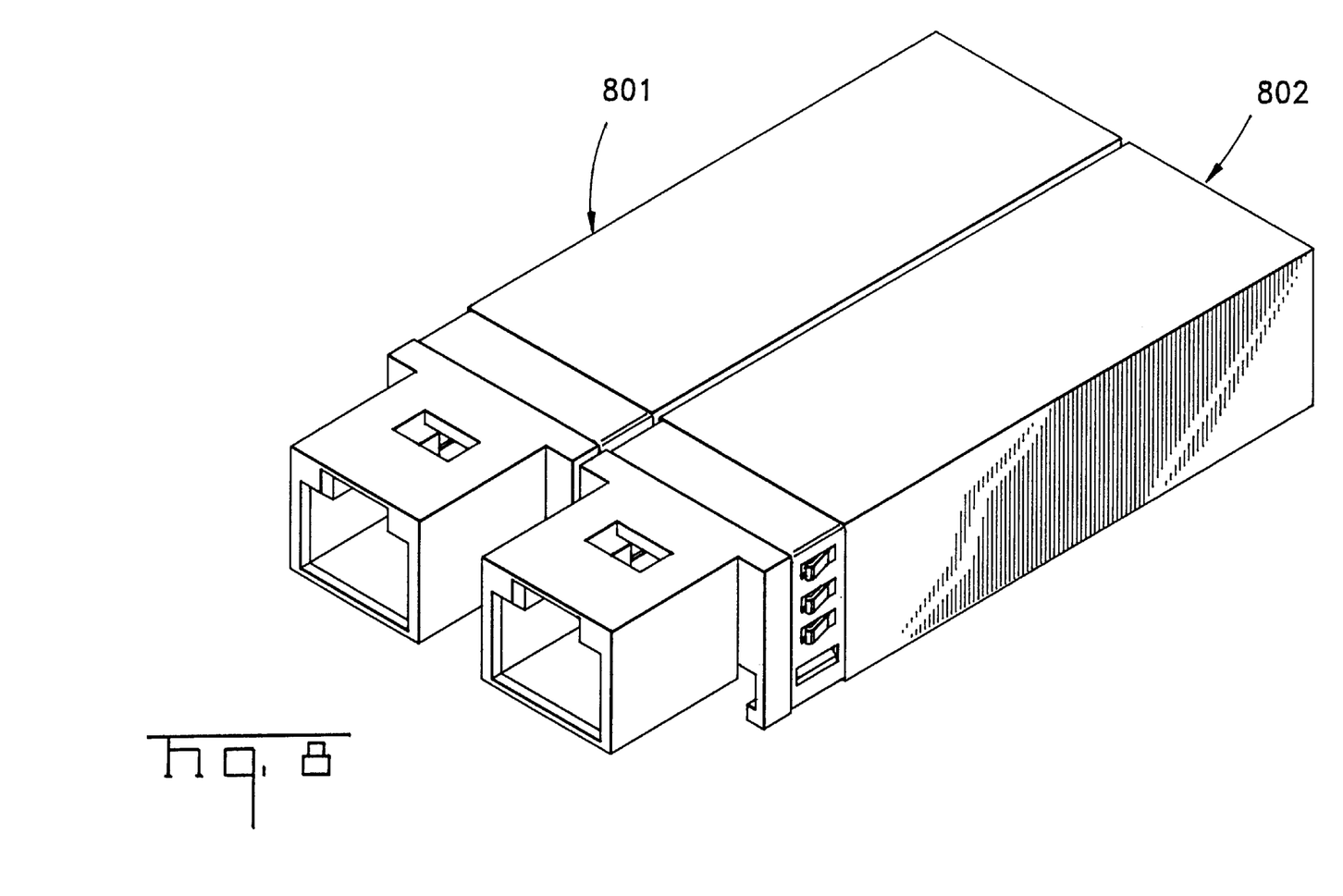
FIG. 8 is a perspective view showing two transceivers in an adjacent manner with the alternative EMI shielding member.
Figure 9:
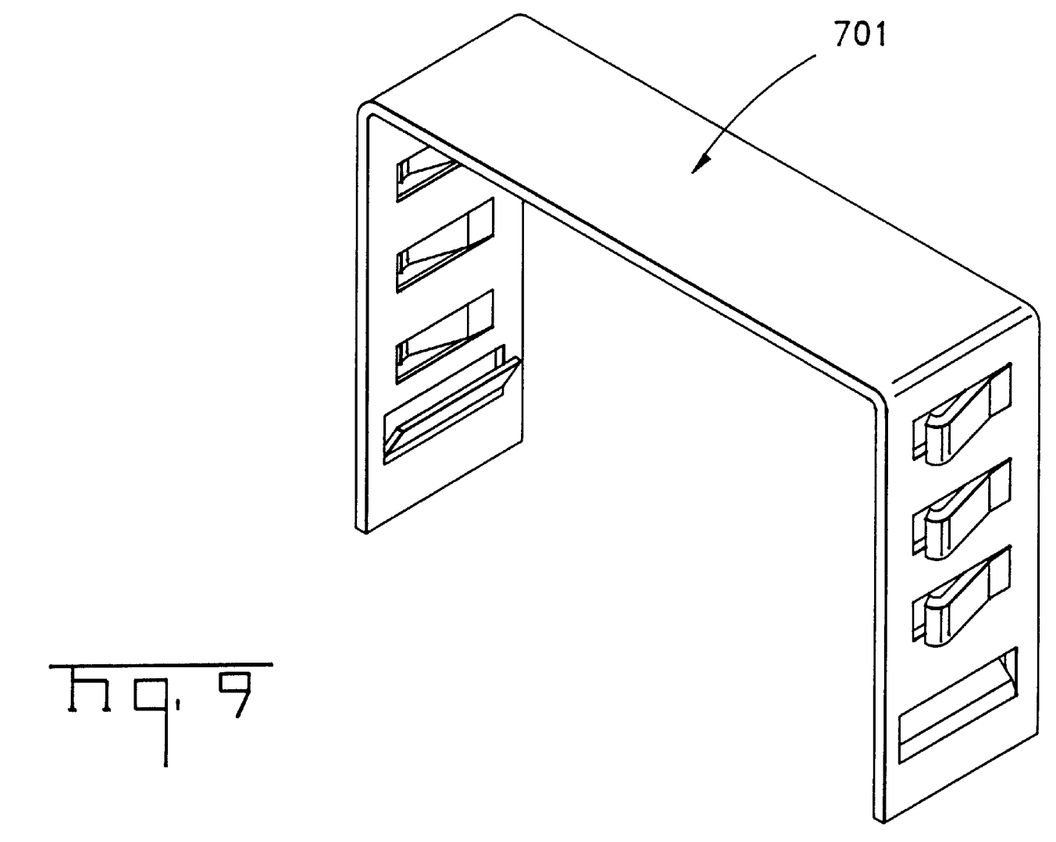
FIG. 9 is a perspective view of the alternative EMI shielding member of the invention of the present disclosure.

FIGS. 7, 8 and 9 show an alternative structure in which a clip member 701 has members 702 which form the interface between the housing members, for example, as shown by housings 801 and 802 in FIG. 8. This alternative embodiment is also feasible and is an alternative embodiment to that shown in FIG. 4.

Figure 5:
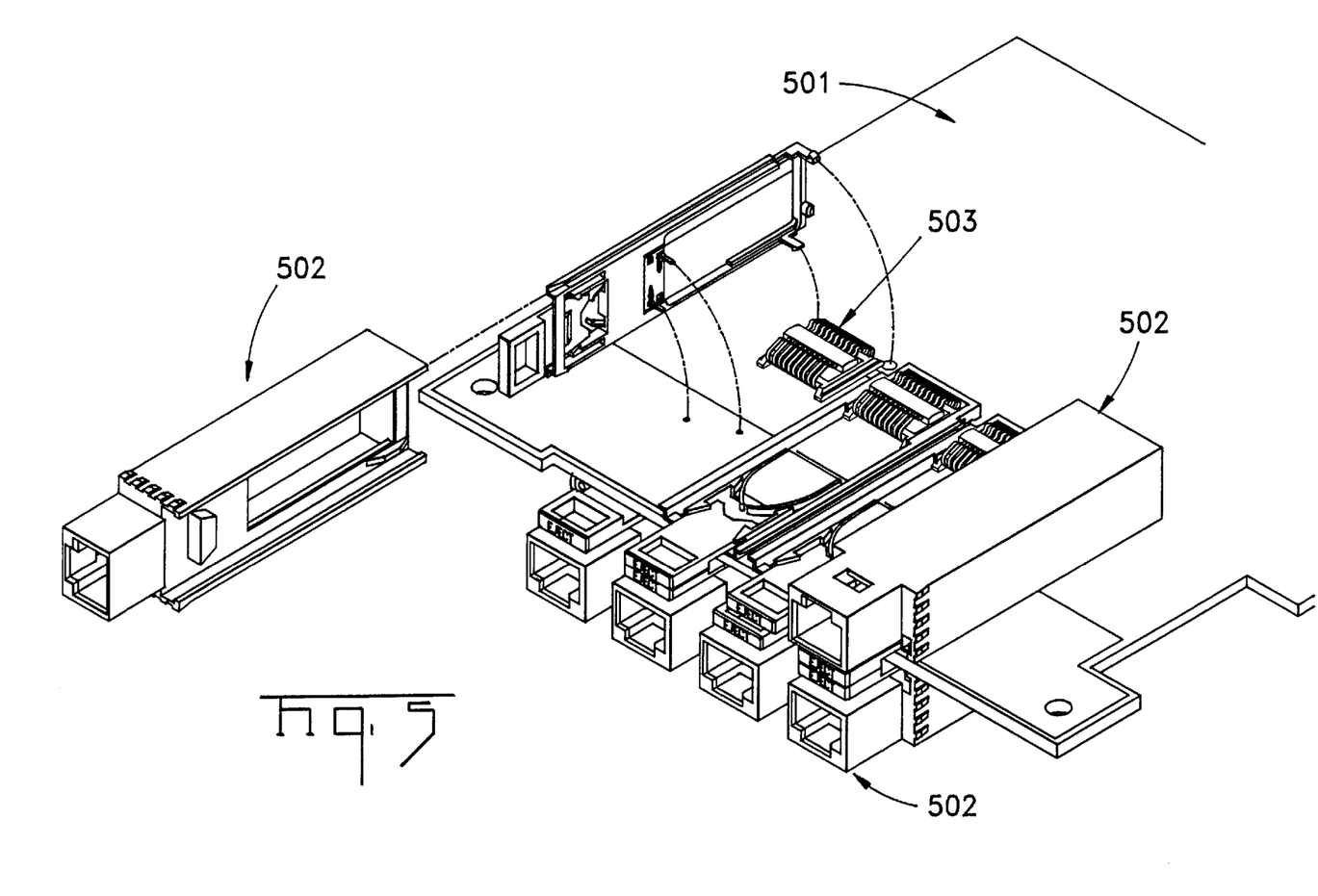
FIG. 5 is a perspective view (one transceiver in exploded view) of the transceiver of the invention of the present disclosure disposed in adjacent manner on either side of the electrical interface, preferably printed circuit board.
Figure 6:
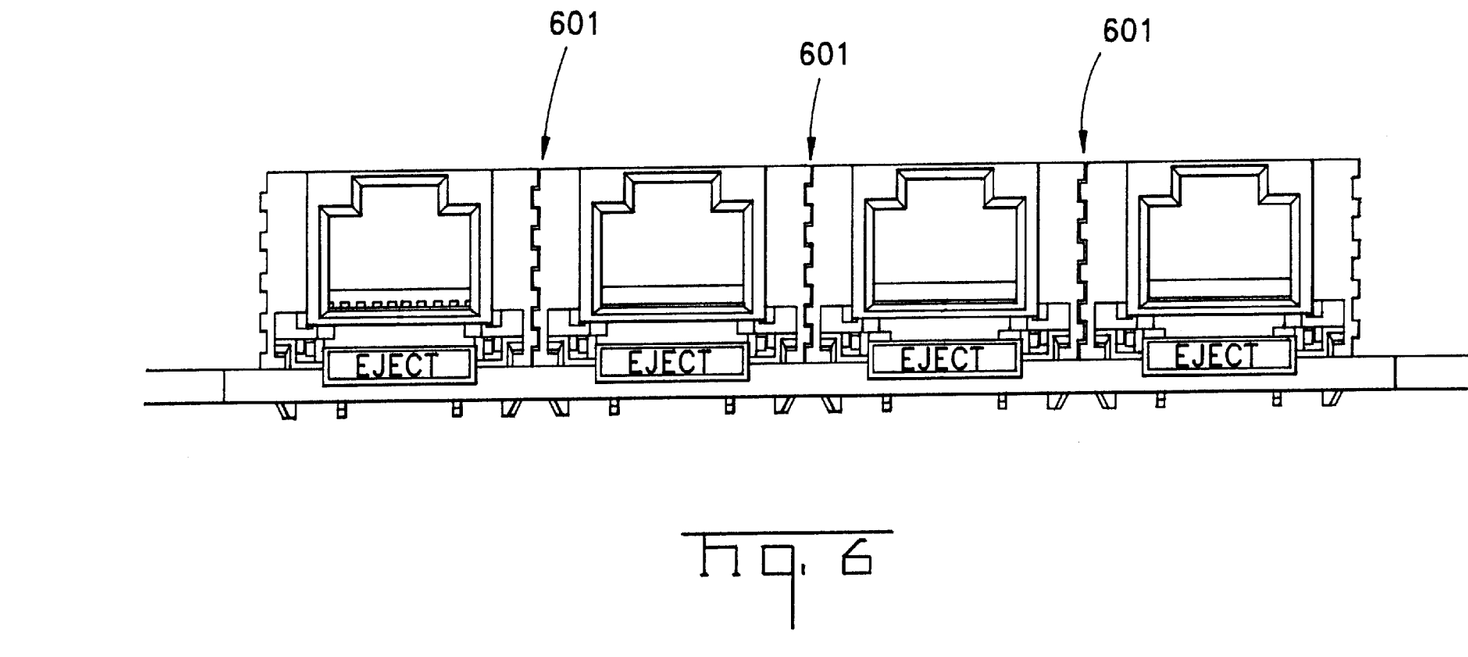
FIG. 6 is a front view of an array of transceivers in a row showing the EMI shielding features of one embodiment of the invention of the present disclosure.

Finally, turning to FIG. 5, an alternative embodiment of the invention of the present invention is shown. The structure shown in FIG. 5 has virtually the same features as those shown, for example, in FIG. 1, however, has the further feature of mounting in a more compact arrangement by making use of either side of the electrical interconnection, for a circuit board shown at 501. That is, the housing members 502 are disposed on either side of the interconnection board 501, and the ejection, electrical ground path, thermal path, and electrical connection shown at 503 are virtually identical to that shown in FIG. 1. Finally, it is also possible to stack transceivers on top on one another.

The invention having been described in detail it is clear that variations and modifications to the invention disclosed herein are within the purview of one of ordinary skill in the art having had the benefit of the present disclosure. To the extent that the transceiver module having improved EMI shielding, an improved dejection mechanism, improved thermal path and electrical ground path through the injection mechanism as well as the improvements disclosed with regard to the electrical contact between the optoelectronic elements in the housing and the interface boards are within the purview of one of ordinary skill in the art having had the benefits of the present disclosure, such are deemed within the scope of the present invention. Additionally, to the extent that the modifications of the invention of the present disclosure, a Z-axis transceiver hot-pluggable to surface mount contacts using the cam/cam follower mechanism described herein to provide the sequential mating capability without the drawbacks of making the contact to the dielectric of the printed circuit board, such are deemed within the scope of the present invention.

What is claimed is:

1. An interconnect system for mating a module, which contains internal circuitry and has a front and back orientation and an axis, to a host circuit board by moving said module axially in a mating direction relative to said host circuit board, said system comprising:

a plurality of first contacts on said host circuit board; and a plurality of second contacts on said module, at least one second contact being partitioned into at least a contact section and a non-contact section, said non-contact section being in front of said contact section relative to said module, said sections being separated from each other by a dielectric portion, said non-contact section being electrically isolated from said internal circuitry, said contact section being electrically connected to said internal circuitry wherein, during mating, one of said first contacts contacts said non-contact section of said at least one second contact before contacting said contact section of said at least one second contact.

2. The system of claim 1, wherein said second contacts are arranged in at least one row which is traverse to said axis, a front edge of each non-contact section of said at least one row defining a leading edge.

3. The system of claim 2, wherein said first contacts are arranged in two rows and said second contacts are arranged in two rows, each row having a leading edge defined by a front edge of each non-contact section of each second contact.

4. The system of claim 2, wherein said leading edge is in front of a point at which a row of said first contacts contacts said module during mating.

5. The system of claim 1, wherein a second contact corresponding to a signal connection has a non-contact section longer than that of second contacts not corresponding to signal connections.

6. The system of claim 5, wherein a second contact corresponding to a power connection has a non-contact section longer than that of second contacts corresponding to ground connections.

7. The system of claim 1, wherein a second contact corresponding to a ground connection has a non-contact section shorter than that of a second contact corresponding to either a power or signal contact.

8. The system of claim 1, wherein each of said second contacts comprises at least a contact section and a non-contact section.

9. The system of claim 1, wherein said dielectric portion between said contact and non-contact section is narrow enough such that said one of said first contacts is able to bridge across said contact and non-contact sections without touching said dielectric portion.

10. The system of claim 1, wherein said second contacts are cantilever contacts.

11. The system of claim 1, wherein said contact and non-contact sections comprise the same material.

12. The system of claim 11, wherein said contact and non-contact sections comprise gold.

13. The system of claim 12, wherein said first contacts are plated with gold.

* * * * *